United States Patent [19]
Henckel et al.

[11] Patent Number: 5,463,725
[45] Date of Patent: Oct. 31, 1995

[54] DATA PROCESSING SYSTEM GRAPHICAL USER INTERFACE WHICH EMULATES PRINTED MATERIAL

[75] Inventors: Jonathan D. Henckel; Paul A. Hospers, both of Rochester, Minn.

[73] Assignee: International Business Machines Corp.

[21] Appl. No.: 998,988

[22] Filed: Dec. 31, 1992

[51] Int. Cl.$^6$ ................................................ G06F 15/00
[52] U.S. Cl. .......................... 395/155; 395/161; 395/152
[58] Field of Search ..................................... 395/155–161; 345/173, 121, 126, 135

[56] References Cited

U.S. PATENT DOCUMENTS

| | | | |
|---|---|---|---|
| 4,855,725 | 8/1989 | Fernandez | 345/173 |
| 4,860,217 | 8/1989 | Sasaki et al. | 345/126 |
| 5,053,762 | 10/1991 | Sarra | 345/113 |
| 5,233,332 | 8/1993 | Watanabe et al. | 345/121 |
| 5,237,651 | 8/1993 | Randall | 395/148 |
| 5,283,864 | 2/1994 | Knowlton | 395/158 |
| 5,295,199 | 3/1994 | Shino | 382/41 |
| 5,333,255 | 7/1994 | Damouth | 395/157 |

FOREIGN PATENT DOCUMENTS

| | | |
|---|---|---|
| 0390611A2 | 10/1989 | European Pat. Off. . |
| 0384986A2 | 9/1990 | European Pat. Off. . |
| 2181864 | 7/1990 | Japan . |
| 2183886A | 6/1987 | United Kingdom . |
| WO87/01481 | 3/1987 | WIPO . |

OTHER PUBLICATIONS

IBM Technical Disclosure Bulletin, vol. 29, No. 1, Jun. 1986 D. G. Wenz, D. N. Youngers, "Bookmarking Online Tutorials".
IBM Technical Disclosure Bulletin, vol. 31, No. 8 Jan. 1989 G. Ditlow, J. O. Fisher, C. A. Pickover and A. R. Reed, "Paging of Display Screen Images Using Footswitch and Digital Interface".
IBM Technical Disclosure Bulletin, vol. 34, No. 2, Jul. 1991 S. S. Fleming, "Graphical Access to Calendar Displays".
IBM Technical Disclosure Bulletin, vo. 34, No. 7A, Dec. 1991 K. M. Baker, "Electronic Book Display".

Primary Examiner—Mark R. Powell
Assistant Examiner—Ba Huynh
Attorney, Agent, or Firm—Kenneth C. Hill; Andrew J. Dillon

[57] ABSTRACT

An interface for making information available to a user provides a display similar to a printed book or magazine. In order to "turn the page" of the displayed book, the user touches the screen with his hand or a pointing device, and moves it across the screen. Movement across the screen, while touching the screen, causes an animated turning of the page of the displayed printed material. This page turning technique is very similar to the turning of a page with an actual book or magazine.

25 Claims, 4 Drawing Sheets

DATA PROCESSING SYSTEM GRAPHICAL USER INTERFACE WHICH EMULATES PRINTED MATERIAL

BACKGROUND OF THE INVENTION

1. Field of the Invention

The present invention relates generally to computer system interfaces, and more specifically to an intuitive graphical display and input interface.

2. Description of the Prior Art

Advances in computer systems have increased accessibility of the information in such systems to unsophisticated users. Advances in display technology, and the capability of computer systems for storing large quantities of useful information, has increased the need for access of such systems by people who do not use them often enough to feel comfortable with traditional information display technology. Intensive efforts are underway in the computer industry generally to find improved ways to display information, and otherwise interact with relatively unsophisticated users.

For example, improvements in data storage and display technologies have combined to make the electronic book possible. Various proposals exist for making a device having the approximate size and shape of a hardback book. The approach is typically to display pages on a screen to look like an actual printed book. Such display technologies can be used with traditional computer display screens.

To turn pages in a book, magazine, or other document which is displayed in such a manner, the user typically touches a paging button dedicated to this purpose. In a few proposed devices, touch sensitive screens have been used for displaying the image of the book pages, and forward and backward paging buttons, or other locations, are displayed on such screen to enable the user to turn the pages. Alternatively, especially for use on a typical computer workstation, a mouse or other pointer device can be used to select the buttons which cause pages to be turned. However, use of such buttons is not particularly intuitive for the unknowledgeable user.

It would therefore be desirable to provide an interface for displaying information which is usable in an intuitive manner by an unknowledgeable user. It is further desirable for such an interface to be as similar as possible to the use of actual paper reading materials such as books and magazines.

SUMMARY OF THE INVENTION

Therefore, according to the present invention, an interface for making information available to a user provides a display similar to a printed book or magazine. In order to "turn the page" of the displayed book, the user touches the screen with his hand or a pointing device, and moves it across the screen. Movement across the screen, while touching the screen, causes an animated turning of the page of the displayed printed material. This page turning technique is very similar to the turning of a page with an actual book or magazine.

BRIEF DESCRIPTION OF THE DRAWINGS

The novel features believed characteristic of the invention are set forth in the appended claims. The invention itself however, as well as a preferred mode of use, and further objects and advantages thereof, will best be understood by reference to the following detailed description of an illustrative embodiment when read in conjunction with the accompanying drawings, wherein:

DETAILED DESCRIPTION OF THE INVENTION

FIGS. 1–4 illustrate various displays in accordance with a preferred embodiment of the present invention. A display device 10 is used for graphical displays as is described below. In the preferred embodiment, display device 10 is a touch sensitive screen capable of displaying high resolution graphics and being used as a touch sensitive input device. The display device 10 may be part of a work station or other computer system, an input/output device connected to a centralized mainframe or other centralized computer system, or a stand alone laptop "electronic book". Electronic books, which approximate the size and shape of a hardback book, are known in the art.

Figure 1:
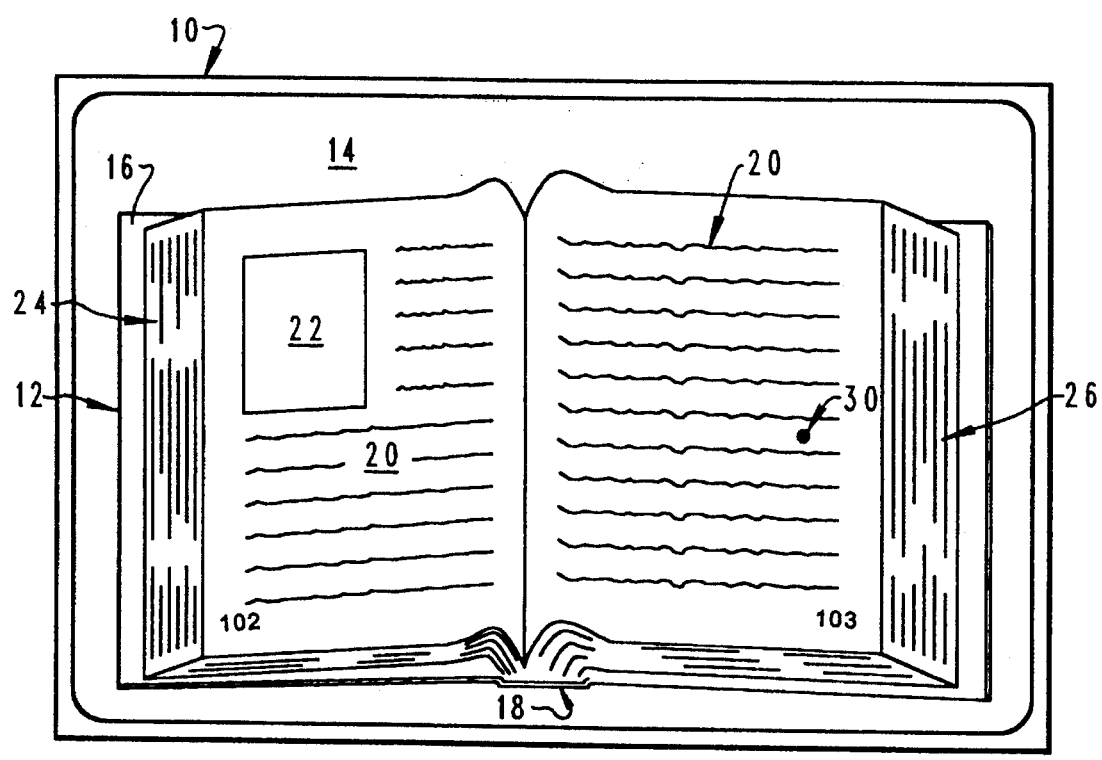
FIGS. 1–4 depict graphical displays showing various operating modes of the interface according to the present invention.

As shown in FIG. 1, a graphical representation of a book 12 is displayed against a background 14. The graphical display of the book 12 is intended to look as much like an actual book as possible. It includes a cover 16 and a spine 18. The pages of the book are shown as connected to the spine 18, and lay open to a desired page. In the example shown in FIG. 1, the book is open to 102 and 103. As shown, the pages of the book contain text 20, with a FIG. 22 on page 102.

Pages which are not displayed are indicated by page edges on the left hand side 24 and the right hand side These page edges provide a visual indication of the location within the book which is displayed. When pages from the beginning of the book are displayed, very few, or no, left page edges 24 are shown, while a larger number of right page edges 26 are shown. Near the end of the book, the number of right page edges 26 will be small, while a larger number of left page edges 24 will be shown.

In prior art systems, a button is typically provided to enable the user to turn the pages of the book. This is somewhat non-intuitive, inasmuch as buttons are not provided to turn the pages of an actual book. In order to make the electronic book as similar as possible to a printed book, a technique is provided for turning pages which is much more intuitive. This is illustrated in FIG. 2.

Figure 2:
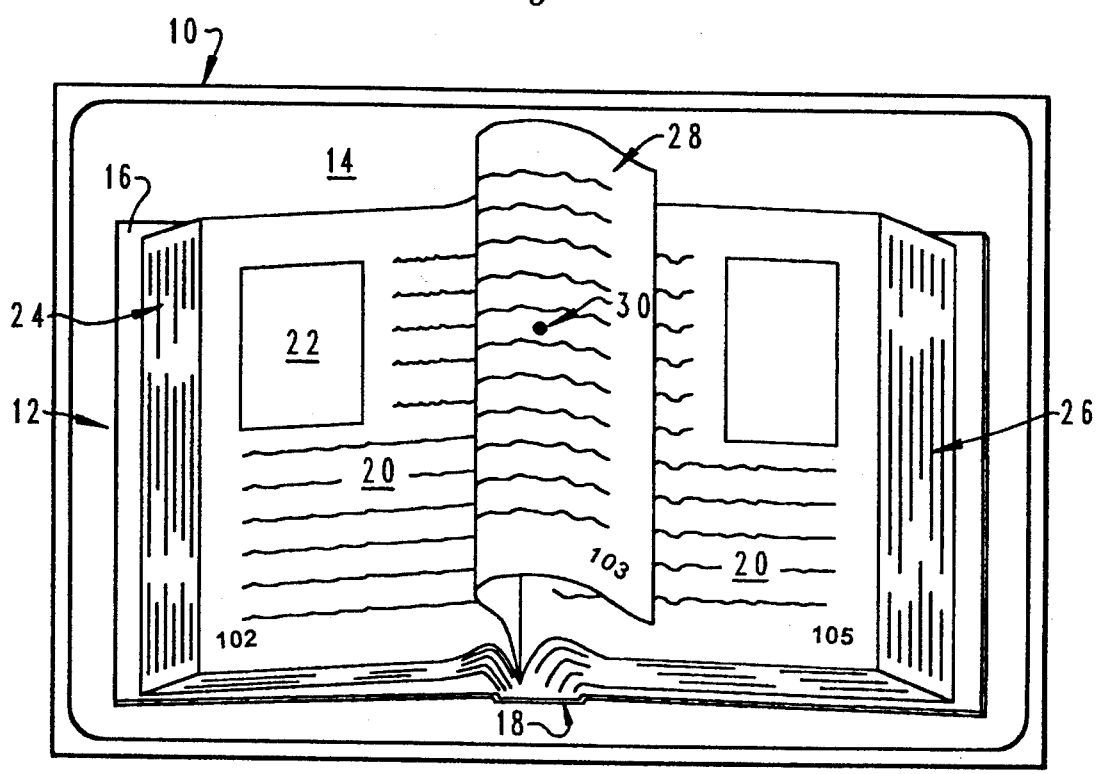

Referring to FIG. 2, the right hand page, page 103, is being turned to expose pages 104 and 105. A turning page graphic 28 is displayed part way through this process of turning a page. In order to turn this page, the user touches the display device 10 somewhere on page 103. The example shown in FIGS. 1 and 2, this point can be, for example, location 30. Any other location on the face of page 103 would be suitable. The user then drags his hand to the left, across the face of the display device 10, and a graphic of a turning page 28 moves with it. Thus, as the user "swipes" his hand from right to left across the surface of the display screen 10 a graphical depiction of a page turning is shown. As the page is turned, the underlying page on the right hand side, page 105 in this instance, is uncovered. At the same time, as the turning page moves to the left, it covers the previously displayed page on that side.

As described above, the location at which the user's swipe begins and ends is not critical. In the example of FIGS. 1 and 2, the user touches the page at location 30, and begins a swipe to the left. So long as the user keeps a finger pressed against the screen the location 30 is maintained underneath the present touch point. In other words, in FIG. 2, the user has slid his finger to the left, still in contact with location 30, and the animation 1 of the page turning has moved with that location. If the user stops the swipe, but leaves his finger pressed against the screen the page will remain in the position shown in FIG. 2. If the user then reverses and begins swiping back to the right, the page will then follow and be returned to the position shown in FIG. 1.

The swipe does not need to be completed all the way to the left hand side of the display device 10. Once a swipe has been begun, as soon as the user lifts his finger off of the touch screen, the animation is continued to complete the turning of the page. Thus, a series of short, fast swipes can be performed by the user to page quickly through the electronic book. For example, assuming a display device which is 12 inches wide, the user preferably need only make a swipe which is one-half to one inch long in order to cause a page to be turned. However, so long as the user's finger remains in contact with the touch screen, the page turn is not completed. This allows a user to turn the page part way in order to see what is on the next page, and then return the page to its original position. The direction of the page turning is the same as the last direction of motion of the contact point 30 just before the user's finger is lifted.

The animation used for the turning of a single page will depend in large part upon the processing power available to the system. If the processing power is great enough, the actual contents of the page being turned can be shown, insofar as they are visible, on the turning page graphic 28. This would require the capability to recalculate the appearance of a partially turned page in real time as the user swipes his finger across the screen.

In many cases, the computational capability will not be available to perform such a real time recalculation of the appearance of the turning page graphic 28. In such instances, the turning page graphic can be simplified, perhaps becoming a blank page of an intermediate grey tone during the page turning process. This would allow some number, perhaps one or two dozen, of intermediate graphic images to be prestored, and displayed in sequence to generate animation and to cover the appropriate portions of the underlying displayed information. The computational demands required to display a generic, uniformly colored moving graphical image are much less than those required to recalculate the actual appearance of the particular page being turned.

Turning back toward the front of the book is performed in a similar manner. The user touches the screen somewhere on the left hand page, and makes swipes to the right. As before, the swipe can be relatively short. The image of a page turning will complete once the user has moved his finger away from the touch sensitive screen.

In order to page quickly to a selected page, the user can perform a number of fast, consecutive swipes. If the animation capability of the display is unable to keep up with the page turning speed of the user, the display can simply pause until the user finishes swiping. The appropriate page edges 24 or 26 can be highlighted in order to indicate how many pages are being turned, and the group of pages turned at one time after swiping ceases.

Figure 3:
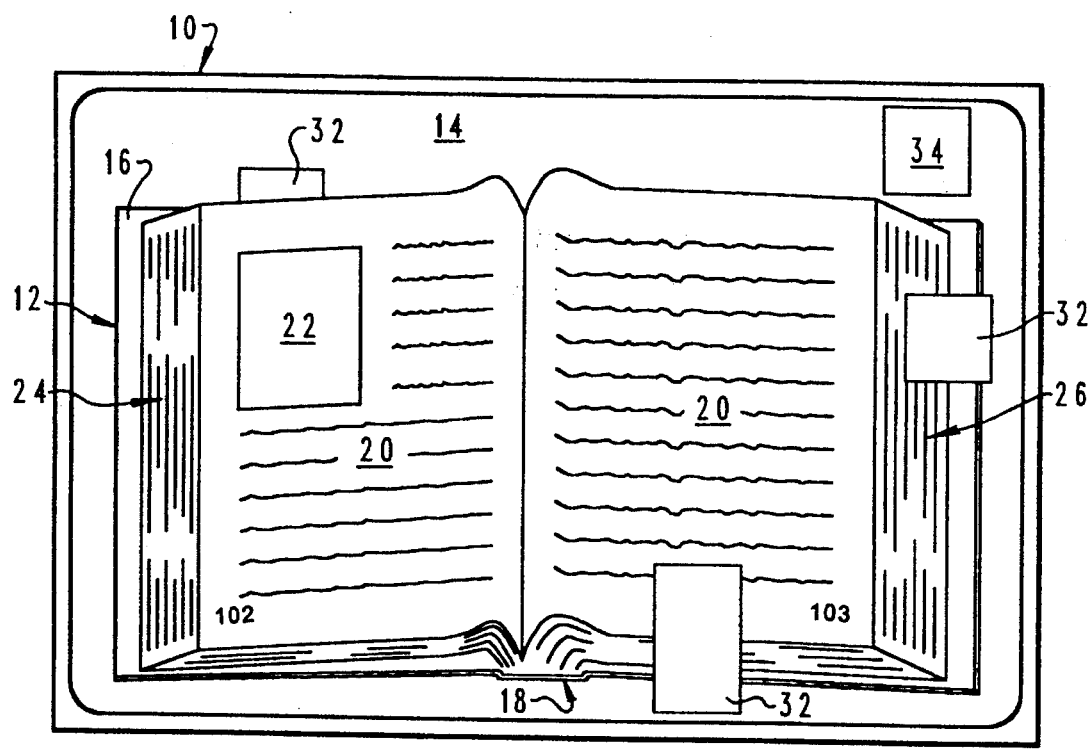

FIG. 3 illustrates an alternative technique for quickly moving to a selected page. Bookmarks 32 may be graphically placed onto a displayed page. These book marks may be placed anywhere on the page, and may specifically be placed so as to project beyond the page edges as shown in the three examples of FIG. 3. When the pages are turned, these bookmarks 32 will remain projecting beyond the page edges as shown.

The bookmarks may also be used for writing notes to be placed into the book. If some type of data entry device, such as a keyboard, is provided, text can be entered onto the bookmark when it is placed into the book. The bookmarks may be thought of, and operate analogously to, the widely available note pads which have an adhesive along one edge for attachment to books and other paper materials. In the preferred embodiment, a stack of markers 34 is provided in the display area. In order to place a marker anywhere on the book, the user touches the marker stack 34 and slides the marker to the appropriate position. When the user lifts his finger, the marker is left in position, and is suitable for receiving text if the system otherwise provides.

In order to quickly turn to a marked page, the user touches the bookmark and makes a left or right swipe as appropriate. Upon releasing contact with the touch screen, a graphical animation of multiple pages turning is displayed, and the page to which the bookmark is attached is displayed.

Figure 4:
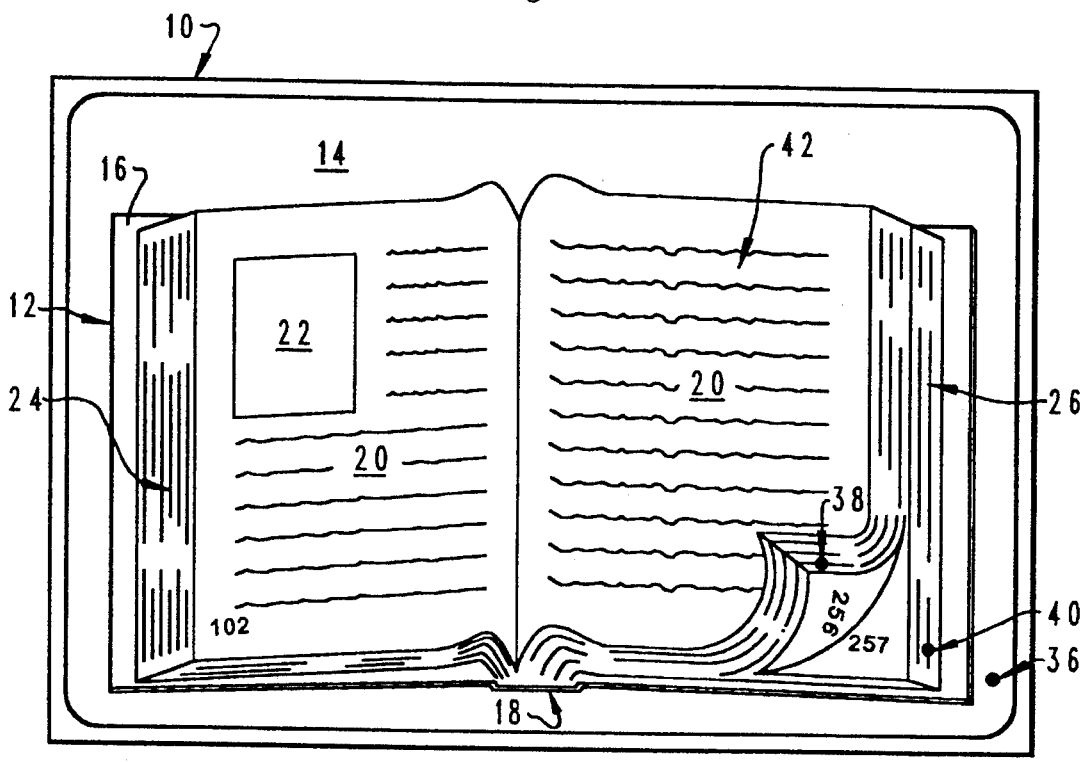

FIG. 4 illustrates another technique for quickly turning to a desired page which may be used in addition to, or instead of, the bookmark method just described. In order to quickly turn to a desired page, the user touches a location along either the left or right hand page edges 24, 26. Alternatively, the user may touch a point slightly outside the graphic display of the book at a location such as location 36, followed by sliding the touch point to a location such as location 38. This causes a corner to be lifted up as illustrated in FIG. 4, displaying the page numbers of the underlying pages. By moving his contact point to a location near location 38, an animation of a page flip occurs with rapidly decreasing page numbers indicated. By sliding the touch location to a position such as location 40, page numbers will increase. (ie, move toward the back of the book) Intermediate locations cause page numbers to increase or decrease at a slower rate, while moving the contact point beyond either locations 38 or 40, along the line approximately connecting these two location causes pages to be flipped at a faster rate. Once the desired page is reached, the user lifts his finger from the touch screen, and a graphic is illustrated showing that the book is turned to that page. If the user changes his mind, and does not wish to flip pages at all, he can move it into the displayed area of the right hand page 42. Lifting his finger at this point causes the pages to remain where they are. The user may also, if desired, slide his finger completely off the book into the background area 14, which also causes the page flipping function to cease.

In the preferred embodiment, such a high speed flipping function may be performed at any of the corners along the left and right page edges 24, 26. Functionality at all four corners is the same, and essentially identical to that described above. Preferably, performing a flipping function at the lower left and right corners shows a change in page numbers. Performing such a flipping function at the upper corners of the pages preferably allows chapter headings, or some other larger unit indicator, to be displayed and selected. Location of page numbers, chapter headings, and so forth, may be changed as desired to suit the demands of any particular implementation.

Figure 5:
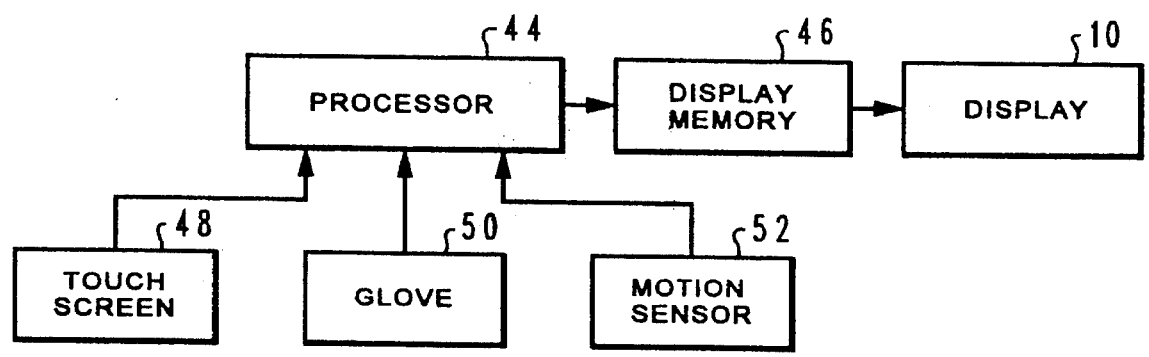
FIG. 5 is a high level block diagram of a control system for the present invention.

FIG. 5 is a high level block diagram of a system capable of performing the display functions previously described. A processor 44 places data into a display memory 46, which in turn drives the display 10. Input may be provided by several different means, including touch screen 48. As described in the preferred embodiment, touch screen 48 is actually part of the display device 10 allowing both input and output functions to be performed on the same device.

If desired, alternative input techniques may be provided. For example, a glove containing sensors, such as are beginning to be used in some relatively sophisticated video games, can be used. By moving his hands in various positions using the glove, the functions described in connection with FIGS. 1–4 may be implemented. In many cases, the glove will need to be used in connection with a hard surface and a pressure sensor on at least one fingertip, in order to indicate the action analogous to touching the touch screen. Other types of motion sensors 52 may be used, such as infrared or sonic sensors which determine movement and/or location of the user's hand. Other types of input techniques may be used as will be appreciated by those skilled in the art. Preferably, the input technique used is relatively intuitive, with a minor amount of practice required to master the technique. The use of a touch screen as described above is very useful, but the technique may also be used with, for example, a mouse or other pointer such as is commonly provided on computer systems.

Figure 6:
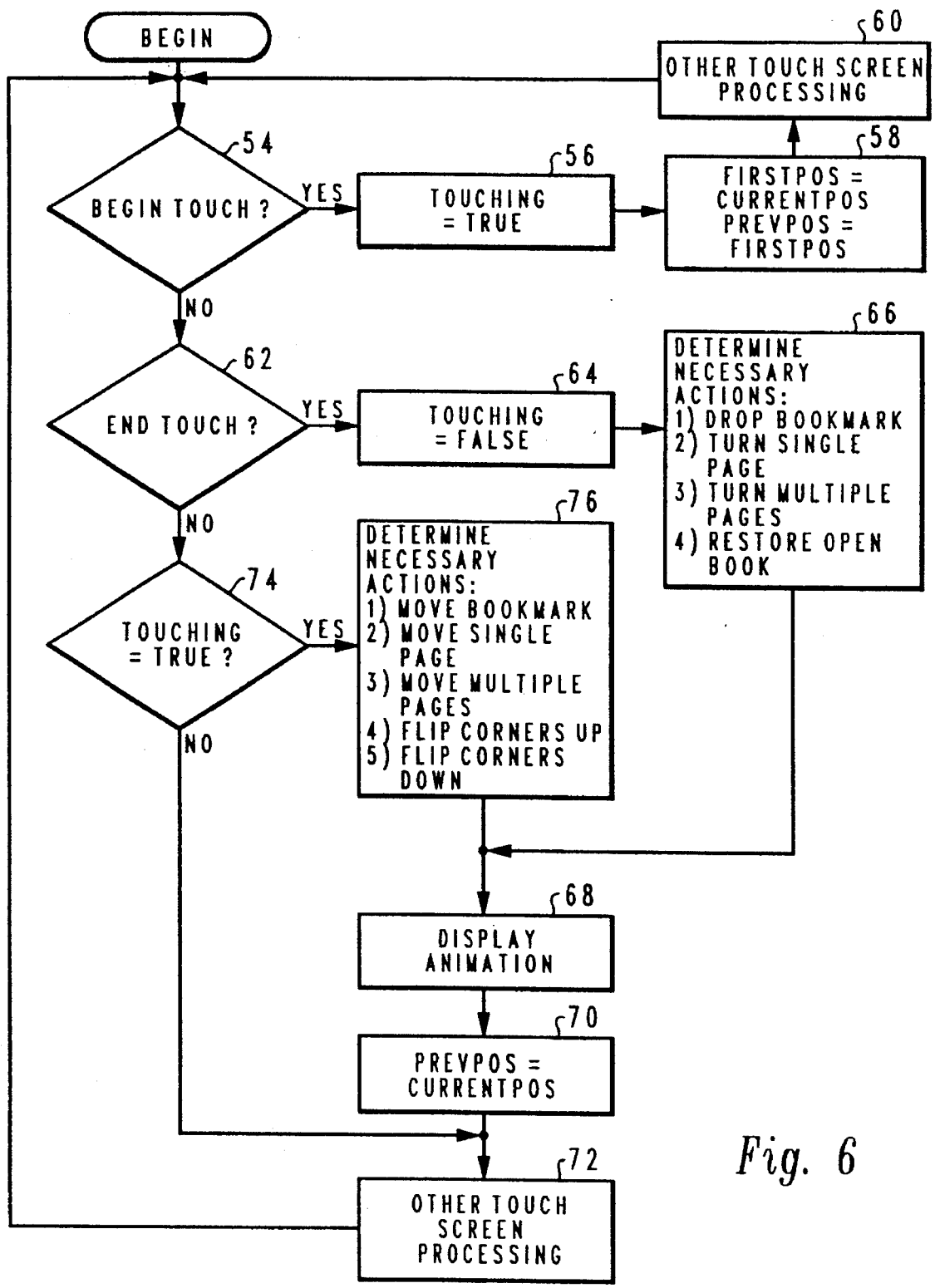
FIG. 6 is a flow chart illustrating flow of control in a computer display system according to the present invention.

FIG. 6 is a high level flow chart indicating control operation of the processor 44 in order to implement the interface functions described above. It depicts a continuous control loop through which the processor circulates in order to process the user inputs.

Initially, a check is made to see if there are any touching events on the input screen. As will be appreciated by those skilled in the art, if a mouse or other input device is used instead of a touch screen, the input events corresponding to those described in FIG. 6 will be processed. The three types of touching events which are considered are the begin and end of a touch, and a continuation of a touch which has already been registered as begun. The continuation can be a touch in the same position, or a movement to a different position without breaking the current, continuous touch. These events may be detected by polling or through interrupts as well known in the art.

If a begin touch event is detected 54, a flag, touching, is set to true 56. This indicates that a touch is currently in effect. In block 58, the variables firstpos and prevpos are set to the current position of the touch. These variables are used to keep track of the movement of the touch point as will be seen below. If any other touch screen processing is necessary, it is performed 60. Such other processing can include any display changes, and related changes, which are performed along with the page turning technique described herein. Also, other processing not related to the turning of pages using the present technique may need to be performed.

Other functions to be used with the electronic book display may be performed simply by touching an appropriate location on the display screen. For example, in the near future it is expected that hypertext connection of data will be implemented in electronic books. Touching a selected location on a displayed page, such as a highlighted word or figure, will cause a separate book or help screen to be displayed, or the displayed book to be turned to the appropriate cross-referenced page. In the latter case, it is preferred that a bookmark be placed in the book so that the current location can be returned to if the hypertext connection is not useful, or once the need for maintaining it is completed.

If step 54 indicated that no begin touch event was occurring, a check is made for an end touch event 62. If such an event occurs, the touching flag is set to false 66. This indicates that any further touches which are sensed must be a new begin touch event. A determination is then made of any appropriate actions which need to be performed. These include: 1) dropping a bookmark in the current touch location; 2) completing the turning of a single page; 3) completing the turning of multiple pages; and 4) restoring the open book to its state before the current touching sequence began.

The animation corresponding to any of the actions described above is then displayed 68. As described previously, this may be a sequence of graphical images displayed to show the turning of a page, etc. Because only a short swiping motion is required to turn a page, in many instances most of the graphics corresponding to the page turning animation will actually be performed after the end touch event is detected.

The variable prevpos is set to the current position in order to remember the point at which the end touch event occurred. Some types of processing may require this information at some future time. Any other required touch screen processing is then performed 72. This is the same type of processing described above with respect to step 60. The processing done at this time may be important to the overall function of a particular product, but need not be relevant to the animated page turning technique.

If the touch event was neither a begin touch nor an end touch, a check is made 74 to see whether touching=true. If not, nothing related to touch events happens. If touching is true, a determination is made of the necessary action to be performed 76. If the current position has changed from the previous position, one of three animations will need to be performed: 1) a bookmark will need to be moved; 2) a single page will need to be moved; or 3) multiple pages will need to be moved. As described above, so long as the current touch event continues, these movements are generally not completed. Thus, the required animation is typically a small movement of the required part of the display to keep the contact point underneath the current touch position.

If the touch position has not moved, no animation event may be required. For example, a touch on a displayed page will cause no animation if there is no movement of the touch location. This is consistent with accepting input for other purposes, such as a hypertext book, as described above. However, if the touch location is located in one of the regions of page edges 24, 26, animation will need to be displayed. Thus the following animated sequences may need to be selected at this point: 4) flipping, or fluttering, the corners of the pages up to display decreasing page numbers, or other indicia, as described above; or 5) flipping the corners of the pages down to display increasing page numbers. After the appropriate determination has been made 76, the corresponding animation is displayed 68, and processing continues as has already been described.

It will be appreciated by those skilled in the art that the described interface technique is very intuitive, functioning in a manner very similar to the use of a printed book. It will be appreciated that such technique may also be adapted to any other type of printed material, such as magazines, newsletters, and so forth. The swiping motion across the touch sensitive screen, or other interface device, allows for pages to be turned in a manner very similar to the process of turning pages in a printed book. The use of bookmarks and page flipping on the corners provides a technique for quickly reaching pages which are not very close to the currently displayed pages.

In systems where computational capacity for graphics is extremely limited, the graphic images of a page turning may be changed to a simpler approach. For example, a simple vertical line moving across the page could be used during a swiping motion. The speed of movement of the vertical line matches the movement of the user's finger during the swipe. This is somewhat less intuitive than the animated turning page, but easier to implement on systems lacking in computational capacity or adequate graphics support.

While the invention has been particularly shown and described with reference to a preferred embodiment, it will be understood by those skilled in the art that various changes in form and detail may be made therein without departing from the spirit and scope of the invention.

What is claimed is:

1. A method for displaying information for a user, comprising the steps of:

displaying an image of a multiple page document on a display device;

specifying, with an input means, a position on a displayed page of the document;

detecting movement of the specified position in a first direction; and in response to movement of the specified position in the first direction, displaying an animated sequence of images corresponding to turning a page of the document in the first direction.

2. The method of claim 1, wherein the displayed animated sequence shows the turning of a single page.

3. The method of claim 1, wherein the animated sequence of images is displayed so as to maintain the location underneath the indicated position as it is moved.

4. The method of claim 3, wherein the displayed animated sequence shows the turning of a single page.

5. The method of claim 4, further comprising the steps of:

after movement has been detected, detecting a termination of the specifying of a position by the input means; and in response to such termination, displaying an animated sequence of images to complete the turning of the page.

6. The method of claim 1, wherein the animated sequence of images shows the turning back of a corner of one or more pages to display a corner of an underlying page.

7. The method of claim 6, wherein the animated sequence of images further shows a sequence of page numbers linearly increasing or decreasing with time.

8. The method of claim 1, wherein the image of the document is displayed on a touch sensitive screen, and wherein the step of specifying a position comprises specifying a position with an input means which includes a touch on the screen.

9. An apparatus for displaying information for a user, comprising:

means for displaying an image of a multiple page document on a display device;

input means for specifying a position on a displayed page of the document;

means for detecting movement of the specified position in a first direction; and means for, in response to movement of the specified position in the first direction, displaying an animated sequence of images corresponding to turning a page of the document in the first direction.

10. The apparatus of claim 9, wherein the displaying means comprises means for displaying the animated sequence to show the turning of a single page.

11. The apparatus of claim 10, further comprising:

means for detecting a termination of the specifying of a position by the input means; and means for, in response to such termination, displaying an animated sequence of images to complete the turning of the page.

12. The apparatus of claim 9, wherein the animated sequence of images shows the turning back of a corner of one or more pages to display a corner of an underlying page.

13. The apparatus of claim 12, wherein the animated sequence of images further shows a sequence of page numbers linearly increasing or decreasing with time.

14. A graphical interface for a computer system, comprising:

a display for displaying graphical images of a multiple page document;

input means for specifying a position corresponding to a selected location on a displayed page of the document;

control means for, in response to a sensed movement of the specified position in a first direction, animating the display to show a page of the document turning in the first direction to display another, previously undisplayed, page.

15. The graphical interface of claim 14, wherein the display and the input means both comprise a touch sensitive display screen.

16. The graphical interface of claim 14, further comprising:

means for, when the selected location is on a portion of the graphical image corresponding to a plurality of page edges for non-displayed pages, animating the display to show a corner of an underlying, non-displayed page.

17. The graphical interface of claim 16, further comprising:

means for showing in succession a sequence of corners of adjacent underlying, non-displayed pages.

18. The graphical interface of claim 14, wherein the graphical image of a document portrays a printed book.

19. The graphical interface of claim 14, further comprising:

means for displaying at least one bookmark in association with a page of the document; and means for, in response to a sensed movement of the input means from a position corresponding to the bookmark, animating the display to show a plurality of pages turned together, followed by displaying the page associated with the bookmark.

20. A method for displaying a multiple page document on a touch screen graphical display device, comprising the steps of:

displaying a graphical image representing the document, wherein the document has at least one displayed page and a plurality of underlying pages which are covered, and which are displayed only as page edges;

sensing a location corresponding to a touch on the screen within an area defined by the displayed page;

in response to the sensed location moving in a first direction, displaying a sequence of images showing an animated representation of a document page turning in the first direction, wherein an underlying page, previously covered, is exposed; and when the touch on the screen is terminated, completing the sequence of images to show the completion of the document page turning.

21. The method of claim 20, wherein the displayed document comprises an image of a book.

22. The method of claim 20, wherein the displayed document comprises an image of a magazine.

23. The method of claim 20, further comprising the steps of:

displaying a portion of a bookmark attached to an underlying page; and when the sensed location begins movement on the bookmark, displaying a sequence of images showing an animated representation of a plurality of pages turning, wherein the underlying page attached to the bookmark is displayed upon completion of the page turning.

24. The apparatus of claim 9, wherein the image of the document is displayed on a touch sensitive screen, and wherein the input of an indicator of position is received in response to a touch on the screen.

25. The method of claim 4, wherein the animated sequence of images is displayed so as to expose a portion of a second page underlying said single page in response to movement of said specified position in the first direction, and further comprising the steps of:

detecting movement of said specified position in a second direction; and in response to detecting movement of said specified position in the second direction before termination of the specifying of a position by said input means, displaying an animated sequence of images to restore said single page to an initial position of said single page prior to receipt of said specified position.

* * * * *

UNITED STATES PATENT AND TRADEMARK OFFICE
CERTIFICATE OF CORRECTION

PATENT NO.   : 5,463,725
DATED        : October 31, 1995
INVENTOR(S)  : Henckel et al.

It is certified that error appears in the above-indentified patent and that said Letters Patent is hereby corrected as shown below:

Column 2, line 35: add --26.-- after "right hand side"

Signed and Sealed this

Thirteenth Day of August, 1996

Attest:

BRUCE LEHMAN

Attesting Officer                Commissioner of Patents and Trademarks